(12) United States Patent
Menard et al.

(10) Patent No.: US 6,820,357 B1
(45) Date of Patent: Nov. 23, 2004

(54) MULTI-PURPOSE TOOL FOR A FRONT END LOADER OF A TRACTOR

(76) Inventors: Donald James Menard, 1631 Sawmill Hwy., Breaux Bridge, LA (US) 70517; John LeeRoy Quebedeaux, Jr., 1631 Sawmill Hwy., Carencro, LA (US) 70517

( * ) Notice: Subject to any disclaimer, the term of this patent is extended or adjusted under 35 U.S.C. 154(b) by 0 days.

(21) Appl. No.: 10/726,319

(22) Filed: Dec. 2, 2003

(51) Int. Cl.[7] .............................. B66C 3/16; B66F 9/04
(52) U.S. Cl. ............................ 37/403; 414/724; 294/88
(58) Field of Search ........................... 37/403–410, 466, 37/468; 172/817; 414/722–726, 697, 739, 740; 294/68.23, 86.41, 88, 104–107

(56) References Cited

U.S. PATENT DOCUMENTS

| | | |
|---|---|---|
| 2,652,939 A | 9/1953 | Burch |
| 2,908,409 A | 10/1959 | Hinders et al. |
| 3,165,345 A | 1/1965 | Gardner |
| 3,455,477 A | 7/1969 | Blair |
| 3,802,731 A | 4/1974 | La Bounty |
| 4,285,628 A | 8/1981 | Jankowski |
| 4,372,063 A | 2/1983 | Work |
| 4,818,005 A | 4/1989 | Purser |
| 5,516,174 A | 5/1996 | Squyres |
| 5,564,885 A | 10/1996 | Staben, Jr. |
| 5,890,754 A | 4/1999 | Murr |
| 5,971,455 A | 10/1999 | Wolin et al. |
| 5,975,604 A | 11/1999 | Wolin et al. |
| 6,176,531 B1 | 1/2001 | Wheeler |
| 6,357,993 B1 | 3/2002 | Burton |
| 6,589,007 B2 * | 7/2003 | Burton .................. 414/724 |
| 2001/0038790 A1 | 11/2001 | Evans |

* cited by examiner

Primary Examiner—Robert E. Pezzuto
(74) Attorney, Agent, or Firm—Domingue & Waddell, PLC

(57) ABSTRACT

A multi-purpose tool for a front end loader of a tractor includes an intermediate support frame, an upper moveable jaw assembly having a plurality of interconnected forwardly extending, spaced-apart parallel fingers pivotally mounted to the top side edge portion of the intermediate support frame, a lower stationary jaw assembly including a plurality of interconnected forwardly extending spaced-apart parallel fingers fixedly mounted to the bottom side edge of the intermediate support frame, a bracket assembly fixedly attached to the back side of the intermediate support frame to mount the multi-purpose tool to a front end loader, and a hydraulic system including at least one hydraulic cylinder positioned on the back side of the intermediate support frame and linked to the upper moveable jaw assembly. Actuation of the hydraulic system causes the upper moveable jaw assembly to pivot towards or away from the lower stationary jaw assembly. The multi-purpose tool being capable of performing a variety of specialized tasks.

20 Claims, 10 Drawing Sheets

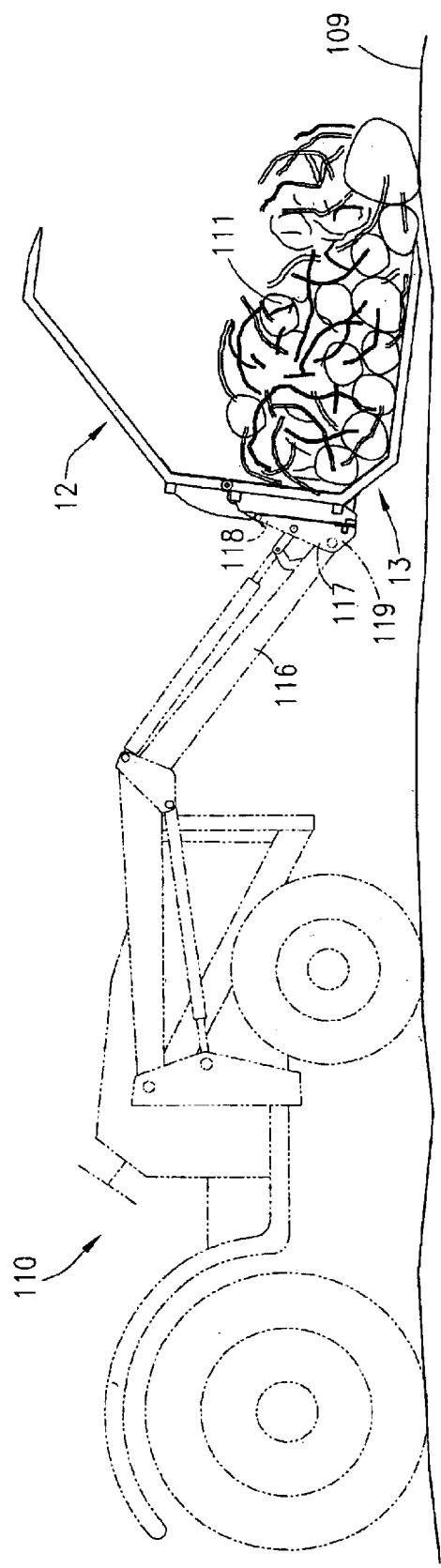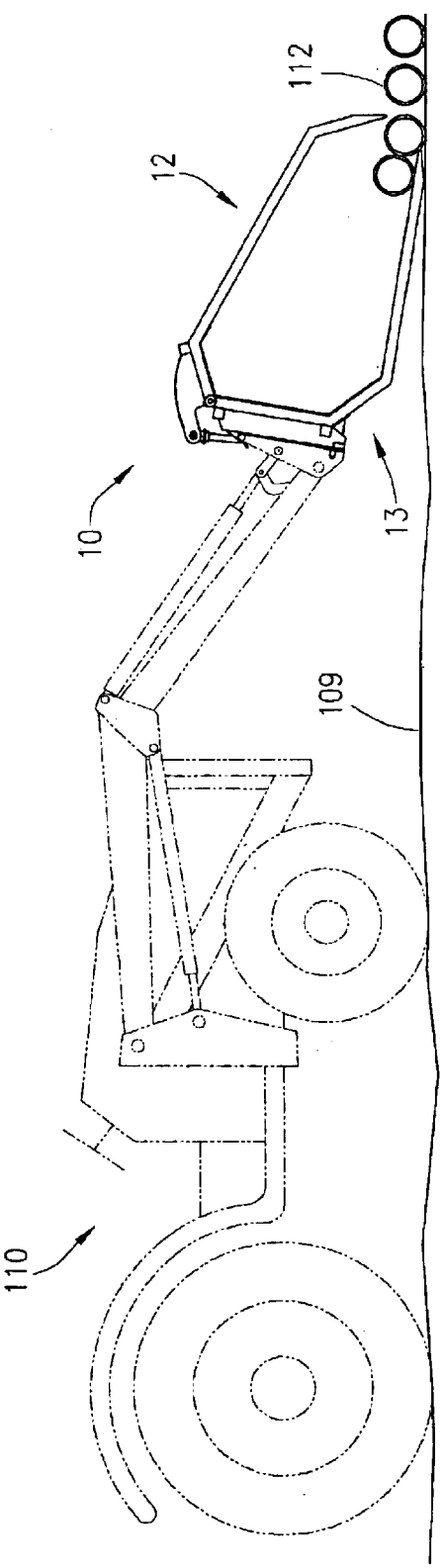

MULTI-PURPOSE TOOL FOR A FRONT END LOADER OF A TRACTOR

FIELD OF THE INVENTION

The present invention relates to a multi-purpose tool for a front end loader, and more particularly to a multi-purpose tool for a front end loader of a tractor that is capable of performing a variety of specialized tasks including picking up and stacking bails of hay, picking up and moving a small diameter pipe, pulling out metal and wood fence posts and small trees and bushes from the ground, reaching up into trees to pull out old branches or vines, digging or pulling out roots in the ground, and smoothing and leveling the surface of the ground. The present invention also relates to a novel method of operating a multi-purpose tool for a front end loader.

BACKGROUND OF THE INVENTION

Farm and construction equipment often includes a tractor equipped with a front end loader. Typically the front end loader has two arms connected to a single pivoting frame or to two separate pivoting frames. A selected work attachment or tool is attached to the pivoting frame. A hydraulic actuation unit is provided on the tractor for raising and lowering the pivoting frame and for rotating or tilting the pivoting frame. This manipulation of the pivoting frame causes the work attachment or tool connected to the pivoting frame to be raised and lowered and/or rotated or titled.

Work attachments or tools for front end loaders have customarily been designed to perform a specific task or a small number of related tasks. For example, one of the most commonly used work attachments is the bucket or scoop. The bucket is able to scoop up and haul dirt, gravel, feed, and other similar particulate matter. Small items such as cut tree limbs, bricks, small stones, 2×4 boards, can also be contained within the bucket; however, these items, because of their shape or size, may require placement in the bucket by hand rather than being scooped into the bucket by the tractor. The bucket can also be used to grade and smooth the ground.

The small holding area of the bucket and its scooped configuration make it difficult, if not impossible, to pick-up and haul large, bulky items such as bails of hay, long pieces of timber or wood, or large flat items like sheets of plywood. Components have therefore been developed that attach to the bucket to provide for expanded uses.

U.S. Pat. No. 5,564,885 describes one such bucket attachment. The bucket attachment includes forward projecting fork tines attached to the base of the bucket and a pivotally mounted grapple hook attached to the rear wall of the bucket. The fork tines enable the bucket to be used as a fork lift unit. The grapple hook acts to hold and secure materials within the bucket. Other bucket attachments are described in U.S. Pat. No. 4,285,628 (grapple system), U.S. Pat. No. 4,372,063 (bush clearer apparatus), and U.S. Pat. No. 6,357,993 (grapple component).

Bucket attachments, while attempting to expand the usefulness of the bucket, still have functional limitations. For instance, the grapple units employed in combination with the bucket have limited capabilities; they are designed to retain an object of restricted size against the bucket. They cannot pick up large or unwieldy items such as sheets of stacked plywood nor are they precise enough to pick up a small diameter pipe or grasp and remove a limb or vine from a tree.

Other specialized work attachments for front end loaders are described in the following patents: U.S. Pat. No. 2,652,939, describes a grab attachment for moving bales of hay or cut brush; U.S. Pat. No. 2,908,409, describes a rock remover attachment for digging and moving rocks; U.S. Pat. No. 3,165,345, describes fork attachment for handling small logs; U.S. Pat. No. 3,455,477, describes a material handling device for picking up and moving unbaled hay and other similar material; U.S. Pat. No. 6,176,531, describes a grapple system attachment for grabbing and lifting heavy loads; and U.S. Published Patent Application No. 2001/0038790, describes a bale handling apparatus for manipulating bales of hay.

The specialized work attachments described in these patents are designed to accomplish a limited or narrow task. For a person desiring to perform many tasks, this means purchasing several different work attachment units, which can be costly. In addition, the particular work attachment capable of performing the specific task to be undertaken would need to be attached to the front end loader. This may require removal of the existing tool attached to the front end loader and attachment of the tool to be used. While removing and attaching a work tool is not particularly difficult, such effort is time consuming.

Accordingly, there exists a need for a multi-purpose tool for a front end loader that has the capabilities of performing a variety of specialized tasks.

SUMMARY OF THE INVENTION

It is accordingly an object of the present invention to provide a novel multi-purpose tool for a front end loader that obviates many of the problems of the prior art and which combines into one tool a multi-functional attachment.

It is another object of the present invention to provide a novel multi-purpose tool for a front end loader that has the capability to perform a variety of tasks including the ability to pick up and stack a bail of hay, pick up and move pipe having a diameter as small as one-inch, pull out from the ground metal and wood fence posts and small trees and bushes, reach up into trees to pull out old branches or vines, dig or pull out roots in the ground, and smooth and level the surface of the ground.

It is another object of the present invention to provide a novel method of operating a multi-purpose tool for a front end loader.

These objects and advantages of the present invention are achieved by providing a multi-purpose tool for a front end loader that has an upper moveable jaw assembly with forward projecting fingers that are pivotally mounted by a hinge mechanism to the top of an intermediate support frame and a lower stationary jaw assembly with forward projecting fingers that are fixedly mounted to the bottom of the intermediate support frame.

The upper moveable jaw and lower stationary jaw assemblies each have an angular shape which provides for greater functionality of the multi-purpose tool. The length and positioning of the fingers of the upper moveable jaw and lower stationary jaw assemblies also contribute to the enhanced usefulness of the multi-purpose tool.

A bracket assembly is positioned on the backside of the intermediate support frame. The bracket assembly enables the multi-purpose tool to be attached to the pivoting frame(s) or platform of the front end loader.

A hydraulic system positioned on the back side of the intermediate support frame is also provided. Actuation of the hydraulic system is capable of causing the upper moveable jaw assembly to pivot from an open position to a closed position or from a closed position to an open position relative to the lower stationary jaw assembly. In the closed position, a portion of the upper moveable jaw assembly is positioned below the lower stationary jaw assembly, which further increases the functionality of the tool.

The present invention is also directed to a novel method of operating the multi-purpose tool of the present invention. The multi-purpose tool of the present invention is provided and attached to a front end loader. The hydraulic actuation unit of the front end loader is operationally connected to the hydraulic system of the tool. The hydraulic system is actuated causing the upper moveable jaw assembly to pivot towards or away from the lower stationary jaw assembly. In addition, the multi-purpose tool may be titled in a clockwise or counter-clockwise direction or raised and lowered relative to the surface of the ground by manipulation of the front end loader arms or of the pivoting frame(s) or platform.

Many other objects and advantages will be readily apparent to one skilled in the art to which the invention pertains from a perusal of the claims and the following detailed description of preferred embodiments read in conjunction with the appended drawings.

BRIEF DESCRIPTION OF THE DRAWINGS

FIG. 8 is a side view of an embodiment of the multi-purpose tool of the present invention attached to a front end loader illustrating use of the tool to pick up refuse.

FIG. 9 is a side view of an embodiment of the multi-purpose tool of the present invention attached to a front end loader illustrating use of the tool to pick up pipes.

DETAILED DESCRIPTION OF PREFERRED EMBODIMENTS

Figure 1:
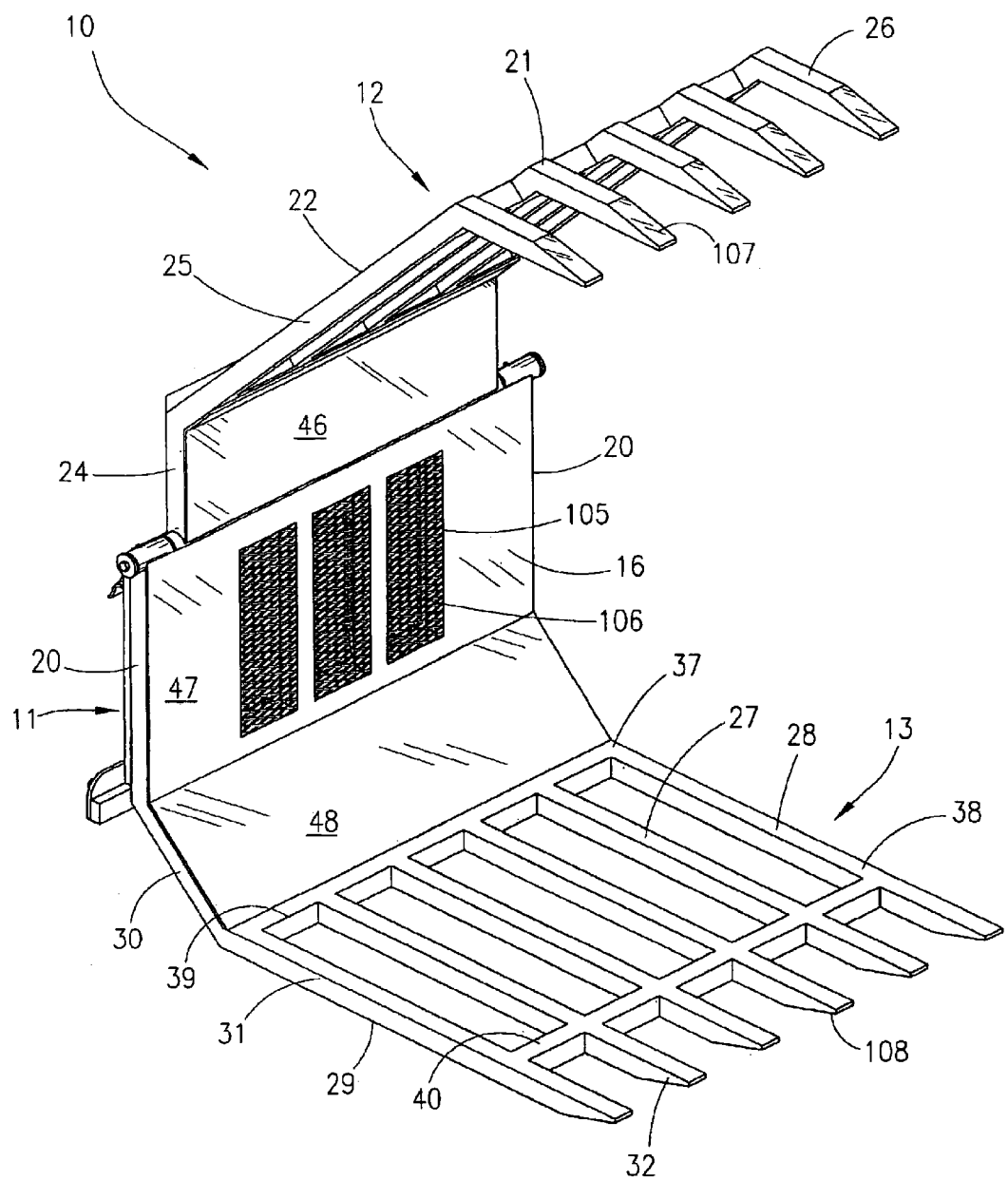
FIG. 1 is a front-side perspective view of an embodiment of the multi-purpose tool of the present invention.

With reference to the figures where like elements have been given like numerical designation to facilitate an understanding of the present invention, and particularly with reference to the embodiment of the present invention illustrated in FIGS. 1, 2, 3, 4 and 5, multi-purpose tool 10 may be constructed of intermediate support frame 11, upper moveable jaw assembly 12, lower stationary jaw assembly 13, bracket assembly 14, and hydraulic system 15.

Preferably, intermediate support frame 11, upper moveable jaw assembly 12, lower stationary jaw assembly 13, and bracket assembly 14 are constructed of a high strength metal such as steel. Accordingly, the various components (which are described herein) comprising intermediate support frame 11, upper moveable jaw assembly 12, lower stationary jaw assembly 13, and bracket assembly 14 are preferably assembled by welding the components together.

Figure 2:
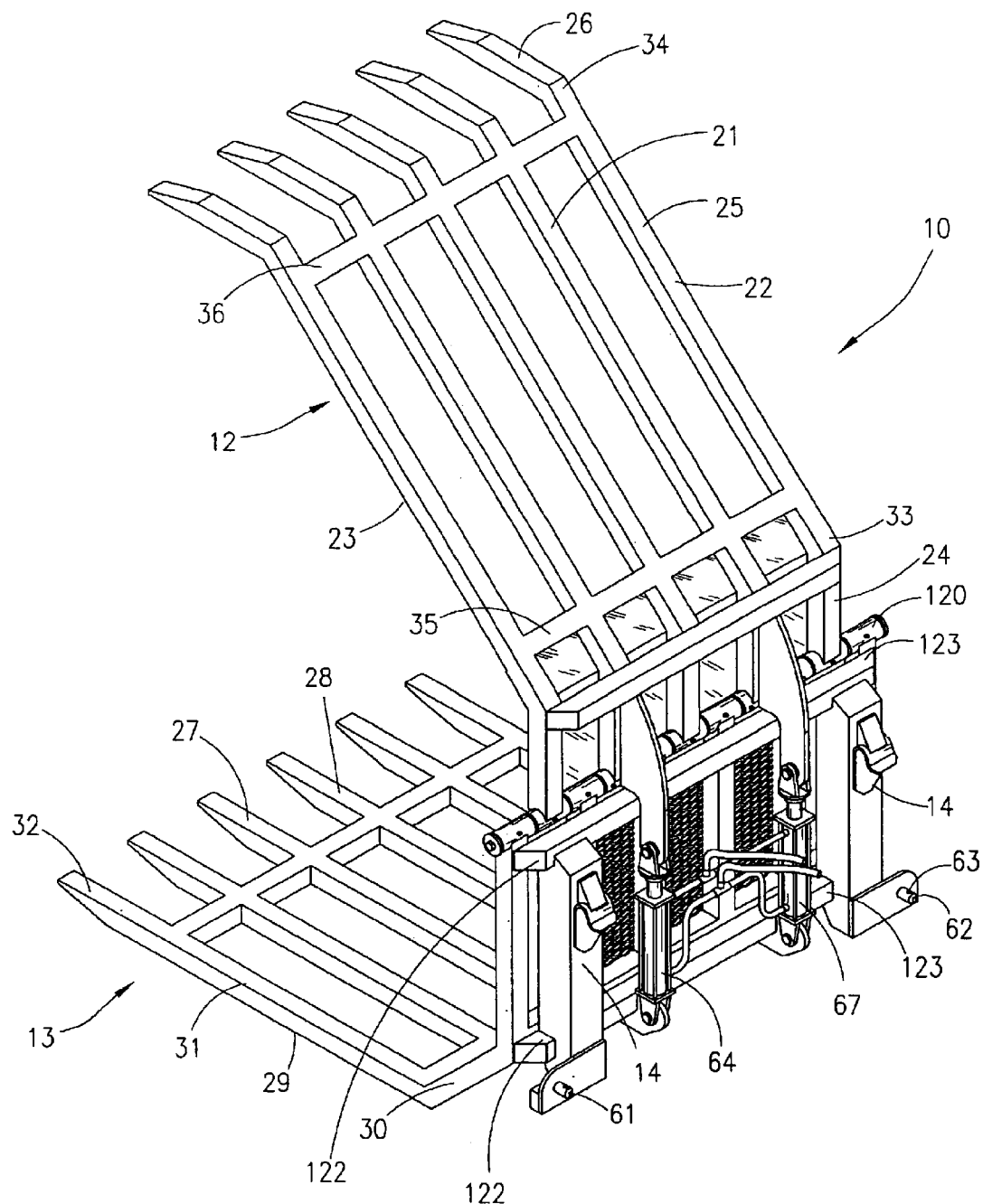
FIG. 2 is a back-side perspective view of an embodiment of the multi-purpose tool of the present invention.

With reference to FIGS. 1 and 2, intermediate support frame 11 may include front side 16, back side 17, top side edge portion 18, bottom side edge 19, and side edges 20 and 21. In the preferred embodiment of the present invention, intermediate support frame 11 contains bottom support beam 42 and plurality of support posts 43. Support posts 43 preferably extend upward and perpendicular to bottom support beam 42. Each support post 43 may have upper end 44 and lower end 45. Preferably, lower end 45 of each support post 43 is fixedly attached to bottom support beam 42. For example, lower end 45 of each support post 43 may be welded to bottom support beam 42.

Figure 5:
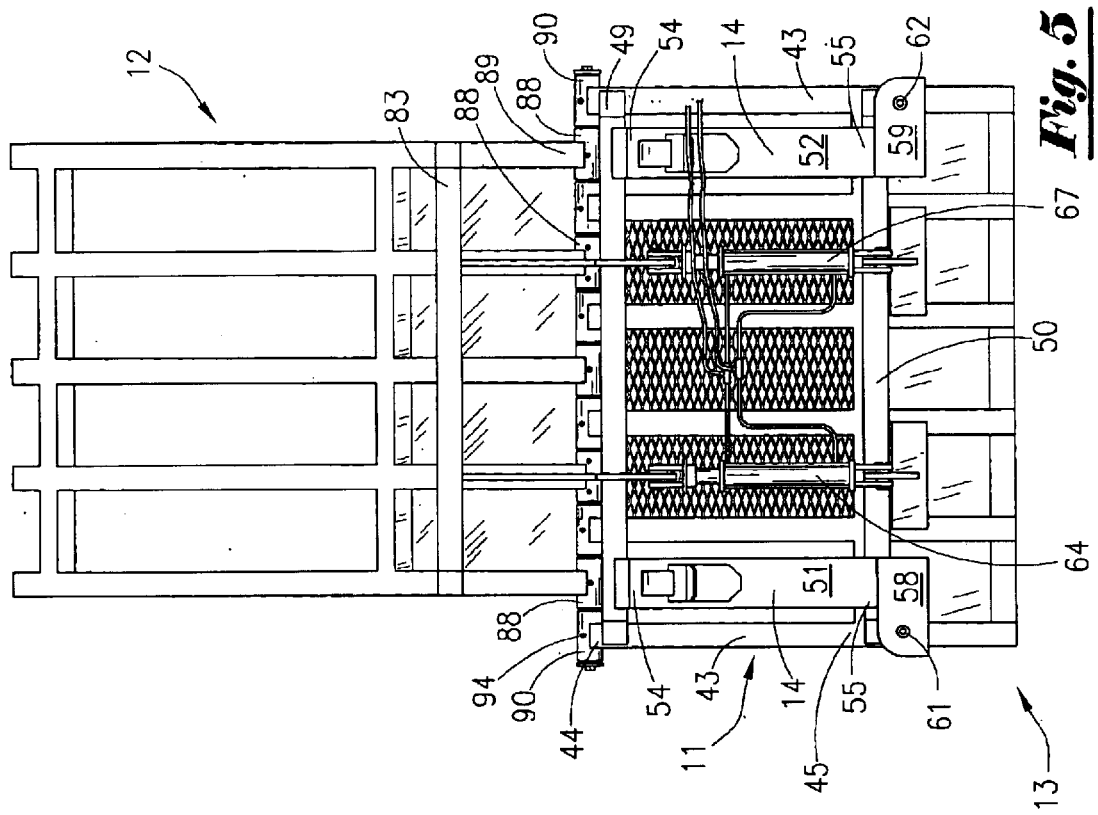
FIG. 5 is a back-side view of an embodiment of the multi-purpose tool of the present invention with the upper moveable jaw assembly in a fully opened position.
Figure 4:
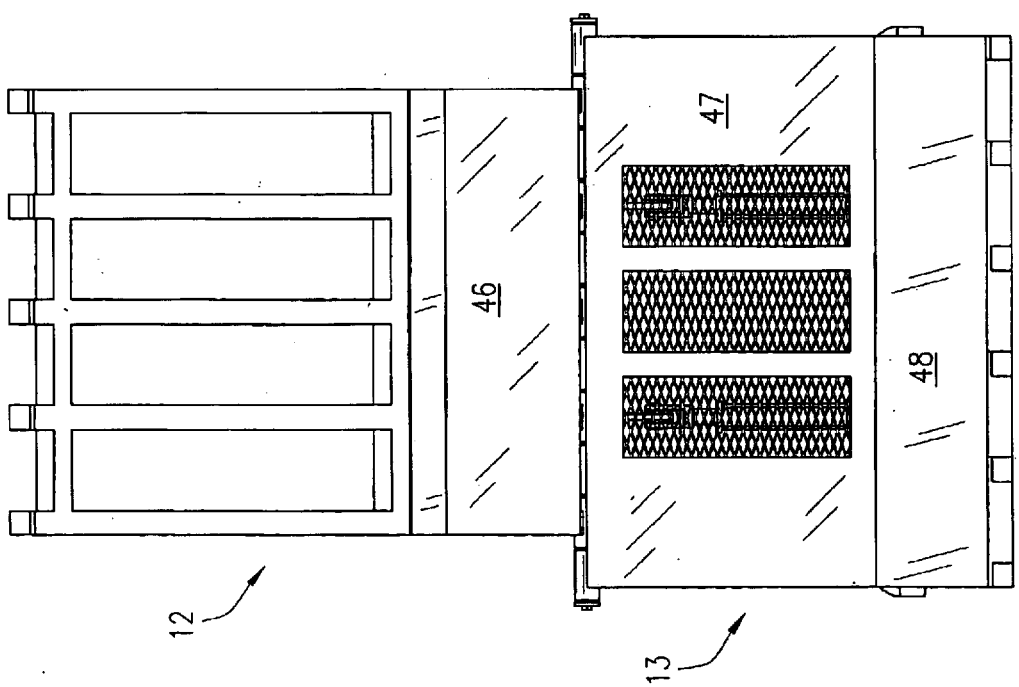
FIG. 4 is a front-side view of an embodiment of the multi-purpose tool of the present invention with the upper moveable jaw assembly in a fully opened position.

In the preferred embodiment of multi-purpose tool 10 shown in FIG. 5, intermediate support frame 11 has six support posts 43. However, it is to be understood that less than six or more than six support posts 43 may be used to form intermediate support frame 11. Preferably, between two and six support posts 43 are used to construct intermediate support frame 11.

Preferably, intermediate support frame 11 has a rectangular shape with a width in the range of 40 to 70 inches and a height or length in the range of 20 to 35 inches. More preferably, intermediate support frame 11 has a width of 52¼ inches and a height or length of 27½ inches.

As shown in FIG. 1, front side 16 of intermediate support frame 11 may have cover plate 47 fixedly attached thereto. Cover plate 47 may have one or more cutouts or windows 105 and cutouts or windows 105 may be covered with mesh screen 106. Cover plate 47 is designed to act as a barrier and prevent any materials that are held within multi-purpose tool 10 from coming into contact with components of multi-purpose tool 10 that are situated on back side 17 of intermediate support frame 11, as for example hydraulic system 15. Cover plate 47 is preferably a steel plate, and is preferably welded to front side 16 of intermediate support frame 11.

Figure 3:
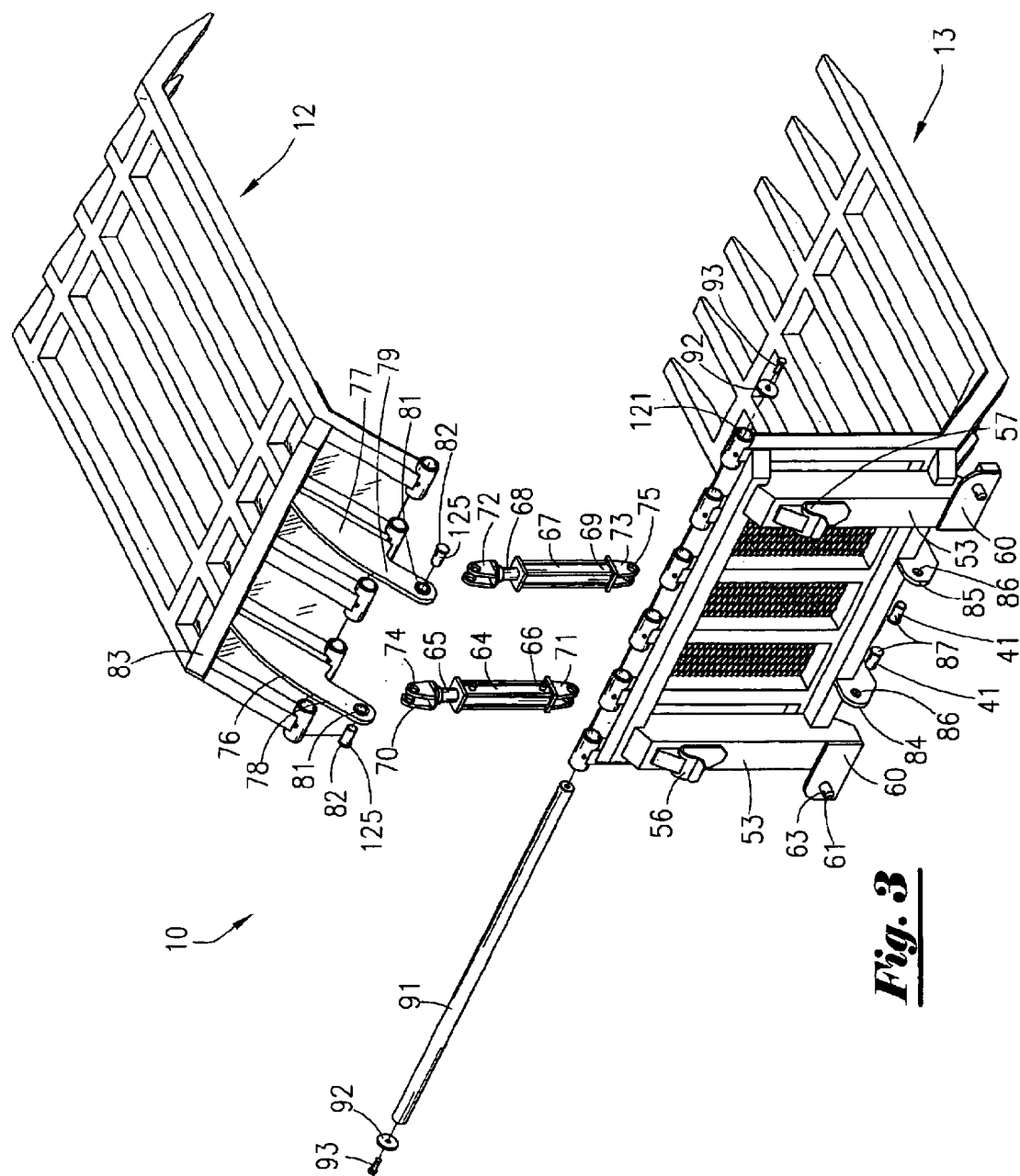
FIG. 3 is an exploded, back-side perspective view of an embodiment of the multi-purpose tool of the present invention illustrating the pivotal mounting of the upper moveable jaw assembly to the intermediate support frame and the construction and positioning of the hydraulic system.

FIGS. 1, 2, and 3 illustrate the construction of upper movable jaw assembly 12. Upper moveable jaw assembly 12 preferably is formed of plurality of interconnected forwardly extending, spaced-apart parallel fingers 21. It is preferred that upper moveable jaw assembly 12 is pivotally mounted to top side edge portion 18 of intermediate support frame 11. Upper movable jaw assembly 12 preferably includes top side 22, bottom side 23, angled proximal section 24, straight central section 25, and angled distal section 26.

As shown in FIGS. 1 and 3, angled proximal section 24 of upper moveable jaw assembly 12 and angled distal section 26 of upper moveable jaw assembly 12 are each angled downward relative to straight central section 25. Preferably, the angle of angled proximal section 24 and the angle of angled distal section 26 are each between 30 and 40 degrees relative to straight central section 25. The angular construction of upper moveable jaw assembly 12, in particular the angled relation of angled proximal section 24 and angled distal section 26, imparts an arcuate shape to upper moveable jaw assembly 12. The arcuate shape of upper moveable jaw assembly 12 allows multi-purpose tool 10 to better effectively grip materials, hold larger quantities of materials, and be more precisely manipulated to perform specialized operations.

Each finger 21 of upper moveable jaw assembly 12 may be a unitary piece of metal (preferably a steel bar) in which case angled proximal section 24 and angled distal section 26 are formed by bending fingers 21 in accordance with well known steel fabricating processes. Alternatively, each finger 21 may be formed from separate pieces of a metal bar (e.g., a steel bar) that are welded together to form each finger 21. For example, angled proximal section 24 may be welded at the appropriate angle to first end 33 of straight central section 25 and angled distal section 26 may be welded at the appropriate angle to second end 34 of straight central section 25. Tips 107 of fingers 21 may be tapered to enhance the piercing action of fingers 21, as for example, when fingers 21 are thrust into a bale of hay or ground 109.

In the preferred embodiment of multi-purpose tool 10, upper moveable jaw assembly 12 has five fingers 21. It is to be understood that upper moveable jaw assembly 12 may be constructed with less than five or more than five fingers 21. Preferably, between three and five fingers 21 are included as part of upper moveable jaw assembly 12.

FIG. 2 illustrates that fingers 21 of upper moveable jaw assembly 12 may be interconnected by cross-bars 35, 36. Cross-bars 35, 36 are preferably made of metal, and more preferably, steel. Cross-bar 35 may be positioned at first end 33 of straight central section 25. Cross-bar 36 may be positioned at second end 34 straight central section 25. Cross-bars 35, 36 may be welded to and positioned across fingers 21; however, it is preferred that cross-bars 35, 36 each be constructed of separate metal (e.g., steel) pieces that are aligned between adjacent fingers 21 and welded thereto. While two cross-bars 35, 36 are provided, it is to be understood that one cross-bar or more than two cross-bars can be used.

As shown in FIG. 1, upper moveable jaw assembly 12 may have cover plate 46 fixedly attached to bottom side 23 at angled proximal section 24. Cover plate 46 may have one or more cutouts or windows 105 (not shown) and cutouts or windows 105 may be covered with mesh screen 106 (not shown). Cover plate 46 is designed to act as a barrier and prevent any materials that are held within multi-purpose tool 10 from coming into contact with components of multi-purpose tool 10 that are situated on back side 17 of intermediate support frame 11, as for example hydraulic system 15. Cover plate 46 is preferably a steel plate, and is preferably welded to bottom side 23 at angled proximal section 24 of upper moveable jaw assembly 12.

FIGS. 2, 3 and 5 illustrate the pivotal mounting of upper moveable jaw assembly 12 to intermediate support frame 11. Preferably, upper moveably jaw assembly 12 is pivotally mounted to top side edge portion 18 of intermediate support frame 11 by hinge means. Hinge means preferably comprise first plurality of spaced-apart hinge tubes 88. Each hinge tube 88 is preferably fixedly attached to proximal end 89 of a different finger 21 of upper moveable jaw assembly 12. It is preferred that proximal end 89 of each finger 21 has fixedly attached thereto one hinge tube 88. Accordingly, if upper moveable jaw assembly 12 includes five fingers 21, there would be a total of five hinge tubes 88 provided as part of the hinge means. Preferably, hinge tubes 88 are made of metal such as steel. It is therefore preferred that hinge tubes 88 be welded to proximal ends 89 of fingers 21.

Again with reference to FIGS. 2, 3 and 5, second plurality of spaced-apart hinge tubes 90 are preferably fixedly attached to top side edge portion 18 of intermediate support frame 11. In the preferred embodiment of the present invention, each hinge tube 90 is fixedly attached to upper end 44 of a different support post 43 of intermediate support frame 11. It is preferred that upper end 44 of each support post 43 has fixedly attached thereto one hinge tube 90.

Accordingly, if intermediate support frame 11 has six support posts 43, there would be a total of six hinge tubes 90 provided as part of the hinge means. Preferably, hinge tubes 90 are made of metal such as steel. It is therefore preferred that hinge tubes 90 be welded to upper end 44 of support posts 43.

As shown in FIGS. 2 and 3, first and second plurality of spaced-apart hinge tubes 88, 90 are aligned together in a single-row to form elongated continuous tube 120 having opposite open ends 121. Hinge rod 91 is preferably positioned within elongated continuous tube 120.

A closure means, as for example, end cap 92 and closing bolt 93 are placed over each open end 121 of elongated continuous tube 120 in order to close opposite open ends 121. The closure of opposite open ends 121 serves to maintain hinge rod 91 in elongated continuous tube 120 so that upper moveable jaw assembly 12 is held in place about intermediate support frame 11 and is able to pivot towards or away from lower stationary jaw assembly 13.

FIG. 5 shows hinge tubes 88, 90 each with lubricant access port 94. Lubricant access ports 94 permit the introduction of a lubricant, as for example grease, into the internal cavity (not shown) of hinge tubes 88, 90 and around hinge rod 91. Accordingly, while multi-purpose tool 10 is operational, lubricant can be placed within elongated continuous tube 120 through one or more of lubricant access ports 94 to lubricate hinge rod 91 and thereby coat working surfaces to provide smooth pivoting motion of upper moveable jaw assembly 12.

With reference to FIG. 1, lower stationary jaw assembly 13 may be constructed of plurality of interconnected forwardly extending, spaced-apart parallel fingers 27. It is preferred that fingers 27 be fixedly mounted to bottom side edge 19 of intermediate support frame 11. Preferably, lower stationary jaw assembly 13 has top side 28, bottom side 29, angled proximal section 30, straight central section 31, and straight distal section 32.

As revealed in FIG. 1, angled proximal section 30 of lower stationary jaw assembly 13 may be angled upward relative to straight central section 31. Preferably, the angle of angled proximal section 30 of lower stationary jaw assembly 13 is between 30 and 40 degrees relative to straight central section 31. The angular construction of lower stationary jaw assembly 13, in particular the angled relation of angled proximal section 30 to straight central section 31 and straight distal section 32, permits greater range of manipulation of multi-purpose tool 10. For example, the angular shape of lower stationary jaw assembly 13 provides a greater area for material placement and enables a scooping-like action of multi-purpose tool 10 to pickup materials. In addition, the angular shape of lower stationary jaw assembly 13 provides for enhanced flexibility in the positioning of multi-purpose tool 10, as for example, allowing straight central section 31 and straight distal section 32 to be positioned at a severe (substantially perpendicular) angle in relation to ground 109.

Each finger 27 of lower stationary jaw assembly 13 may be a unitary piece of metal (preferably a steel bar) in which case angled proximal section 30 is formed by bending fingers 27 in accordance with well known steel fabricating processes. Alternatively, each finger 27 may be formed from separate pieces of a metal bar (e.g. a steel bar) that are welded together to form each finger 27. For example, angled proximal section 30 may be welded at the appropriate angle to first end 37 of straight central section 31. Straight distal section 32 may be welded to second end 38 of straight central section 31; however, it is preferred that straight central section 31 and straight distal section 32 be a uniform piece. Tips 108 of fingers 27 may be tapered to enhance the piercing action of fingers 27, as for example, when fingers 27 are thrust into a bale of hay.

In the preferred embodiment of multi-purpose tool 10 shown in FIG. 1, lower stationary jaw assembly 13 has six fingers 27. It is to be understood that lower stationary jaw assembly 13 may be constructed with less than six or more than six fingers 27. Preferably, between four and six fingers 27 are included as part of lower stationary jaw assembly 13.

It is preferred that the width of lower stationary jaw assembly 13 be greater than the width of upper moveable jaw assembly 12. Preferably, the width of lower stationary jaw assembly 13 is in the range of 40 to 70 inches, and the width of upper moveable jaw assembly 12 is in the range of 30 to 50 inches. More preferably, lower stationary jaw assembly 13 has a width of 52¼ inches and upper moveable jaw assembly 12 has a width of 42 inches.

FIG. 1 shows that lower stationary jaw assembly 13 may be interconnected by cross-bars 39, 40. Cross-bars 39, 40 are preferably made of metal, and more preferably, steel. Cross-bar 39 may be positioned at first end 37 of straight central section 31 of lower stationary jaw assembly 13. Cross-bar 40 may be positioned at second end 38 of straight central section 31 of lower stationary jaw assembly 13. Cross-bars 39, 40 may be welded to and positioned across fingers 27; however, it is preferred that cross-bars 39, 40 each be constructed of separate metal (e.g., steel) pieces that are aligned between adjacent fingers 27 and welded thereto. While two cross-bars 39, 40 are provided, it is to be understood that one cross-bar or more than two cross-bars can be used.

With reference to FIG. 1, cover plate 48 may be fixedly attached to top side 28 of lower stationary jaw assembly 13 at angled proximal section 30. Cover plate 48 may have one or more cutouts or windows 105 (not shown) and cutouts or windows 105 may be covered with mesh screen 106 (not shown). Cover plate 48 is designed to act as a barrier and prevent any materials that are held within multi-purpose tool 10 from coming into contact with components of multi-purpose tool 10 that are situated on back side 17 of intermediate support frame 11, as for example hydraulic system 15. Cover plate 48 is preferably a steel plate, and is preferably welded to top side 28 of lower stationary jaw assembly 13 at angled proximal section 30.

Figure 6:
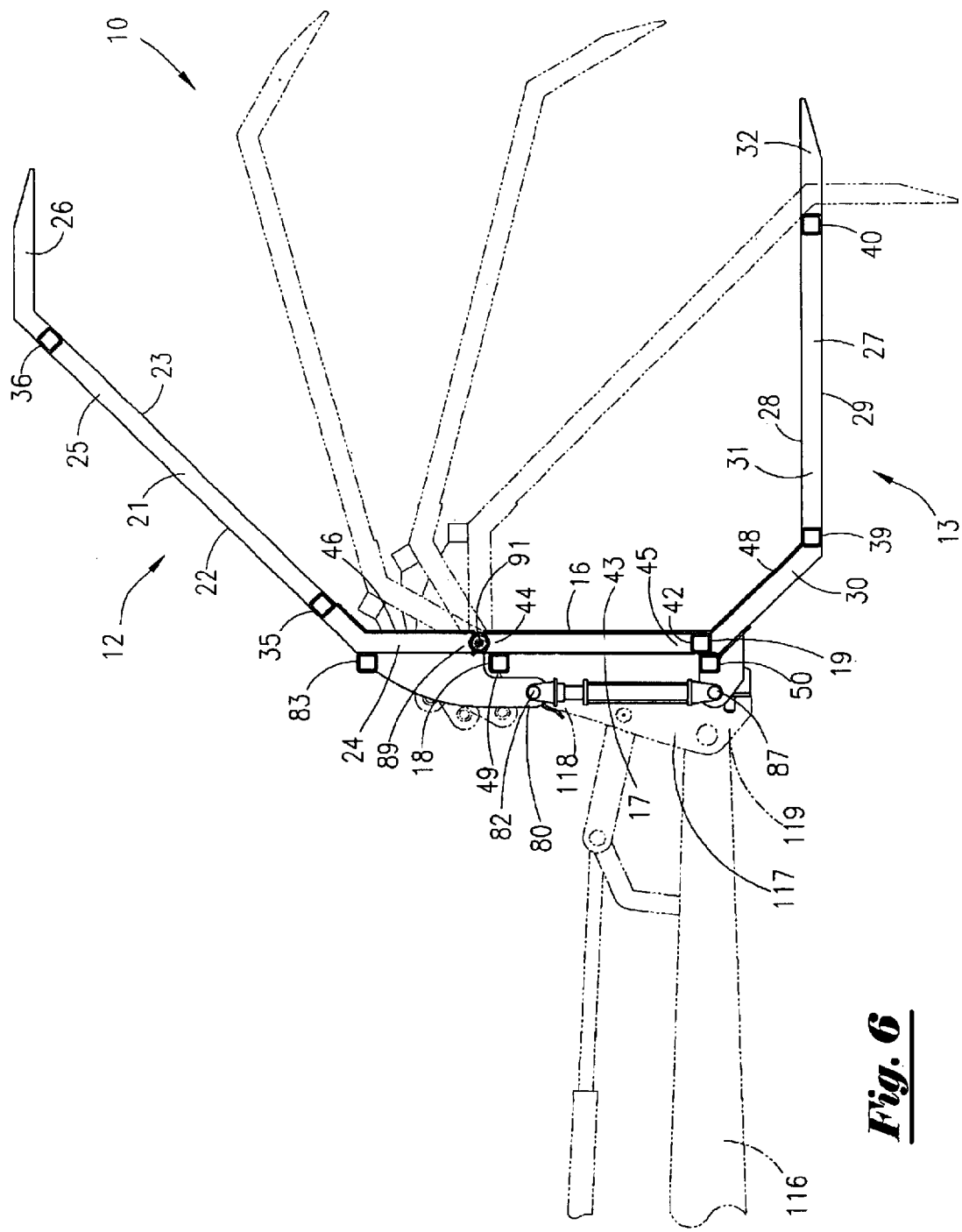
FIG. 6 is a cross-sectional side view of an embodiment of the multi-purpose tool of the present invention with the upper moveable jaw assembly in a fully opened position and further illustrating in phantom various operational positions of the upper moveable jaw assembly.

As best seen in FIG. 6, the length of upper moveable jaw assembly 12 is preferably greater than the length of lower stationary jaw assembly 13. Accordingly, angled distal section 26 of upper moveable jaw assembly 12 is capable of overlapping and extending beyond straight distal section 32 of lower stationary jaw assembly 13. Preferably, the length of upper moveable jaw assembly 12 is in the range of 40 to 70 inches, and the length of lower stationary jaw assembly 13 is in the range of 30 to 60 inches. More preferably, upper moveable jaw assembly 12 has a length of 50 inches and lower stationary jaw assembly 13 has a length of 44 inches.

Figure 13:
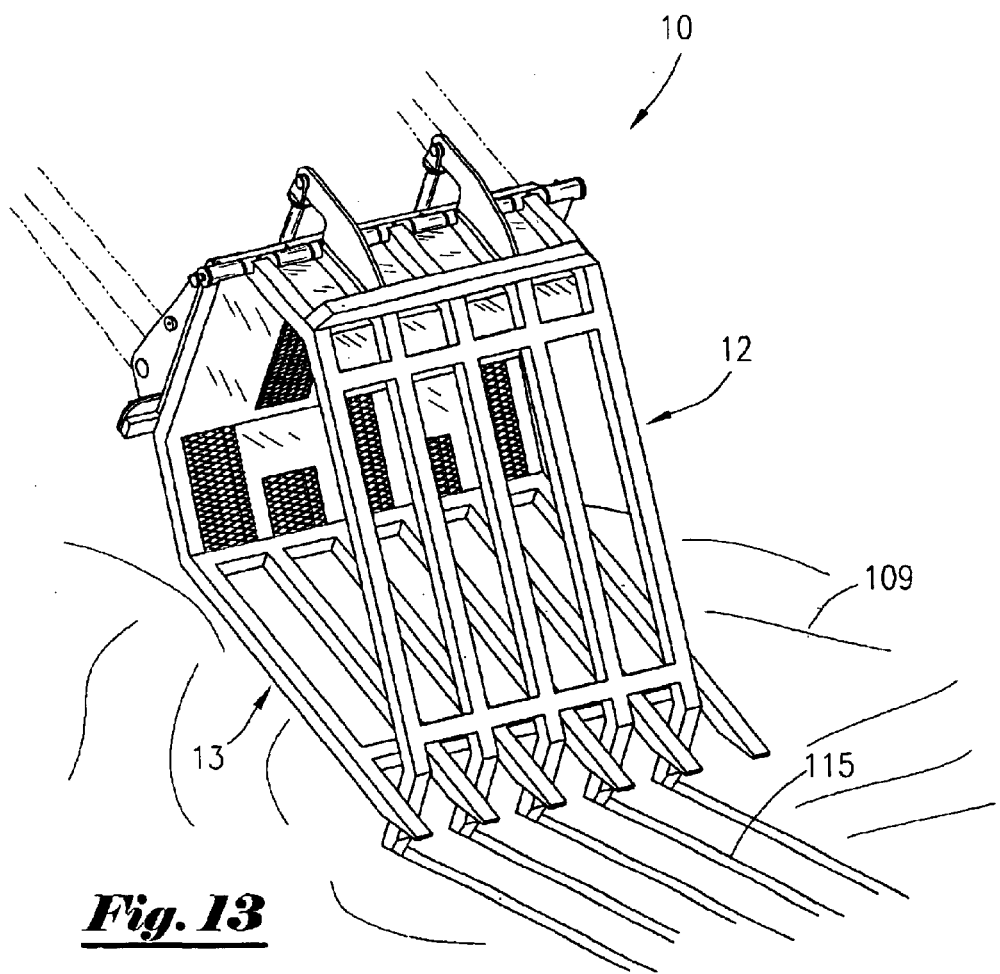
FIG. 13 is a front-side perspective view of an embodiment of the multi-purpose tool of the present invention attached to a front end loader illustrating use of the multi-purpose tool to grade and dig trenches in the ground.

As shown in FIGS. 1 and 13, fingers 21 of upper moveable jaw assembly 12 are each positioned on an axis that is in between two different adjacent fingers 27 of lower stationary jaw assembly 13. Thus, when upper stationary jaw assembly 12 is pivoted downward towards lower stationary jaw assembly 13, fingers 21 of upper moveable jaw assembly 12 (and in particular that portion of fingers 21 that form angled distal section 26 of upper moveable jaw assembly 12) are each positioned between two different adjacent fingers 27 of lower stationary jaw assembly 13.

Figure 7:
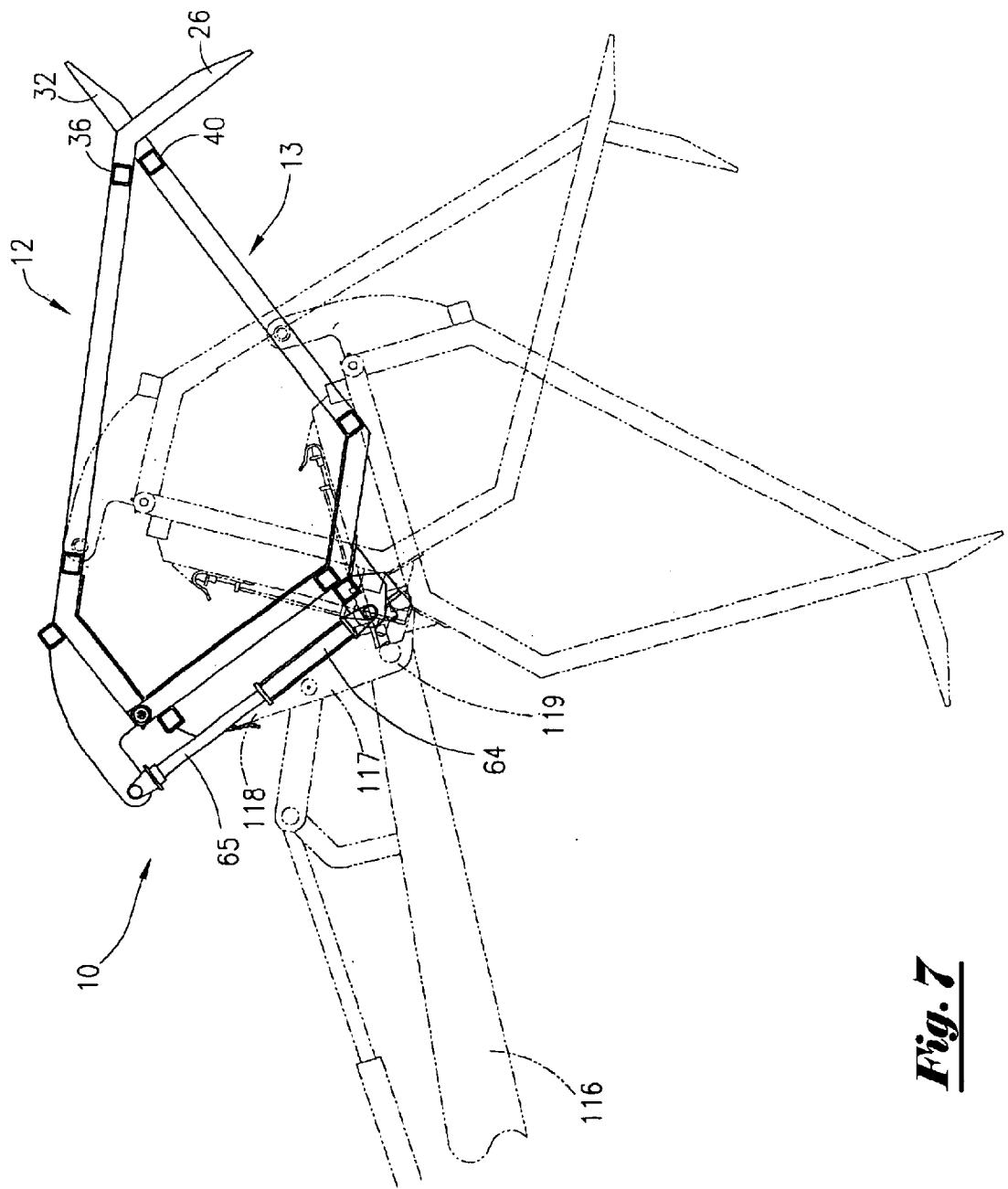
FIG. 7 is a cross-sectional side view of an embodiment of the multi-purpose tool of the present invention with the upper moveable jaw assembly in a fully opened position and further illustrating in phantom various operational positions of the tool.
Figure 12:
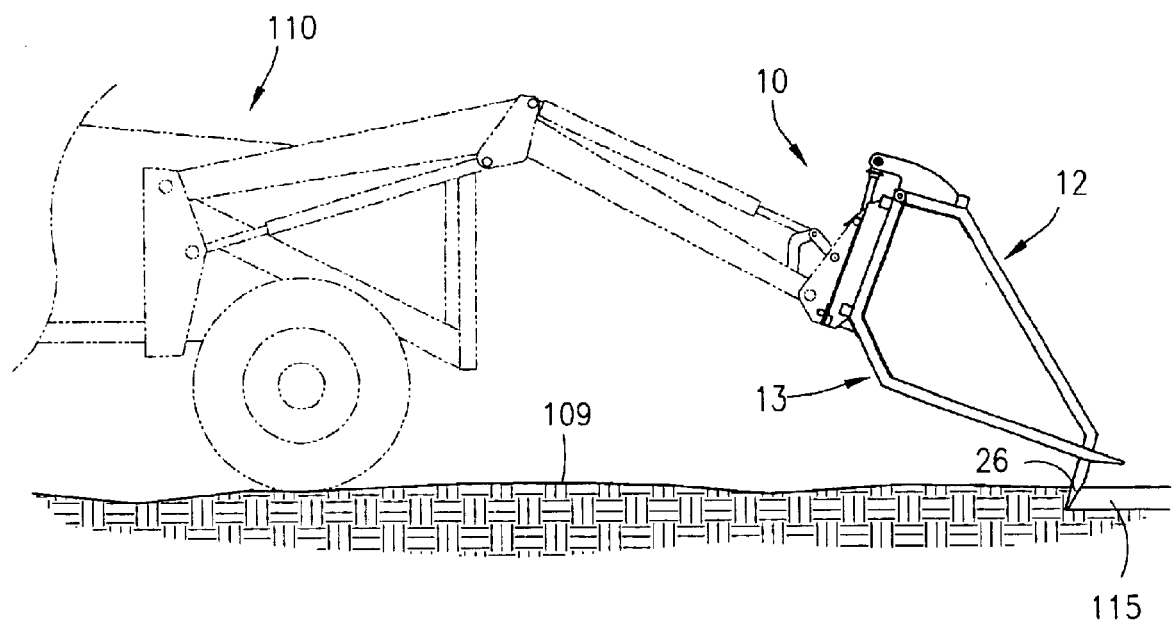
FIG. 12 is a side view of an embodiment of the multi-purpose tool of the present invention attached to a front end loader illustrating use of the multi-purpose tool to grade and dig trenches in the ground.

FIGS. 7, 12 and 13 further illustrate that when upper moveable jaw assembly 12 is pivoted downward towards lower stationary jaw assembly 13 and positioned in the closed position relative to lower stationary jaw assembly 13, fingers 21 of upper moveable jaw assembly 12 (and in particular that portion of fingers 21 that form angled distal section 26 of upper moveable jaw assembly 12) extend below fingers 27 of lower stationary jaw assembly 13. In the preferred embodiment of the present invention, angled distal section 26 of upper moveable jaw assembly 12 abuts crossbar 40 of lower stationary jaw assembly 13 when upper moveable jaw assembly 12 is in a fully closed position.

Preferably, angled distal section 26 of upper moveable jaw assembly 12 extends in the range of 5 to 15 inches below lower stationary jaw assembly 13 when upper moveable jaw assembly 12 is in the fully closed position. More preferably, Preferably, angled distal section 26 of upper moveable jaw assembly 12 extends 10 inches below lower stationary jaw assembly 13 when upper moveable jaw assembly 12 is in the fully closed position.

The advantages of multi-purpose tool 10 derived by the ability of upper moveable jaw assembly 12 to extend below lower stationary jaw assembly 13 will be explained herein.

With reference to FIGS. 2–3 and 8–9, multi-purpose tool 10 may contain bracket assembly 14. Bracket assembly 14 is preferably fixedly attached to back side 17 of intermediate support frame 11. Bracket assembly 14 provides the capability of mounting multi-purpose tool 10 to front end loader 110. The components of bracket assembly 14 (which are described herein) are all made of metal, preferably steel. Accordingly, constructing bracket assembly 14 may be accomplished by welding the components together.

FIGS. 2 and 3 illustrate that bracket assembly 14 may be constructed of upper bracket support bar 49. Preferably, upper bracket support bar 49 is fixedly attached to back side 17 of intermediate support frame 11. More preferably, upper bracket support bar 49 is positioned perpendicular to support posts 43 and is welded thereto. It is preferred that upper support bracket 49 be welded at or near upper end 44 of support posts 43.

Lower bracket support bar 50 is preferably fixedly attached to back side 17 of intermediate support frame 11. More preferably, lower bracket support bar 50 is positioned parallel to bottom support beam 42 of intermediate support frame 11 and is welded thereto. In this position, lower bracket support bar 50 is perpendicular to support posts 43.

First bracket beam 51 interconnects upper bracket support bar 49 and lower bracket support bar 50. Preferably, first bracket beam 51 is fixedly attached or welded at first ends 122 of upper and lower bracket support bars 49, 50. Second bracket beam 52 interconnects upper bracket support bar 49 and lower bracket support bar 50. Preferably, second bracket beam 52 is fixedly attached or welded at second ends 123 of upper and lower bracket support bars 49, 50. First and second bracket beams 51, 52 each preferably have back surface 53 including upper end 54 and lower end 55.

Preferably, first U-shaped bracket 56 is fixedly attached or welded to upper end 54 of back surface 53 of first bracket beam 51. First U-shaped bracket 56 is capable of accommodating upper portion 118 of tool connecting platform 117 of front end loader arm 116. First retaining plate 58 is preferably fixedly attached or welded to lower end 55 of back surface 53 of first bracket beam 51. First retaining plate 58 is capable of detachably securing to lower portion 119 of tool connecting platform 117 of front end loader arm 116.

Preferably, second U-shaped bracket 57 is fixedly attached or welded to upper end 54 of back surface 53 of second bracket beam 52. Second U-shaped bracket 57 is capable of accommodating upper portion 118 of tool connecting platform 117 of the other front end loader arm 116 as shown in FIG. 8. Second retaining plate 59 is preferably fixedly attached or welded to lower end 55 of back surface 53 of second bracket beam 52. Second retaining plate 59 is capable of detachably securing to lower portion 119 of tool connecting platform 117 of the other front end loader arm 116 as also shown in FIG. 8.

FIGS. 2 and 3 reveal that first retaining plate 58 may have retaining pin 61 protruding or extending outwardly from back surface 60 of first retaining plate 58. Retaining pin 61 preferably has bore 63. Retaining pin 61 is capable of being detachably secured to lower portion 119 of tool connecting platform 117. A portion of retaining pin 61 which contains bore 63 passes through a recess (not shown) in lower portion 119 of tool connecting platform 117 and a clasp (not shown) is placed through bore 63 in order to secure first retaining plate 58 in position.

Preferably, second retaining plate 59 has retaining pin 62 protruding or extending outwardly from back surface 60 of second retaining plate 59. Retaining pin 62 preferably has bore 63. Retaining pin 62 is capable of being detachably secured to lower portion 119 of the other tool connecting platform 117. A portion of retaining pin 62 which contains bore 63 passes through a recess (not shown) in lower portion 119 of tool connecting platform 117 and a clasp (not shown) is placed through bore 63 in order to secure second retaining plate 59 in position.

Figure 14:
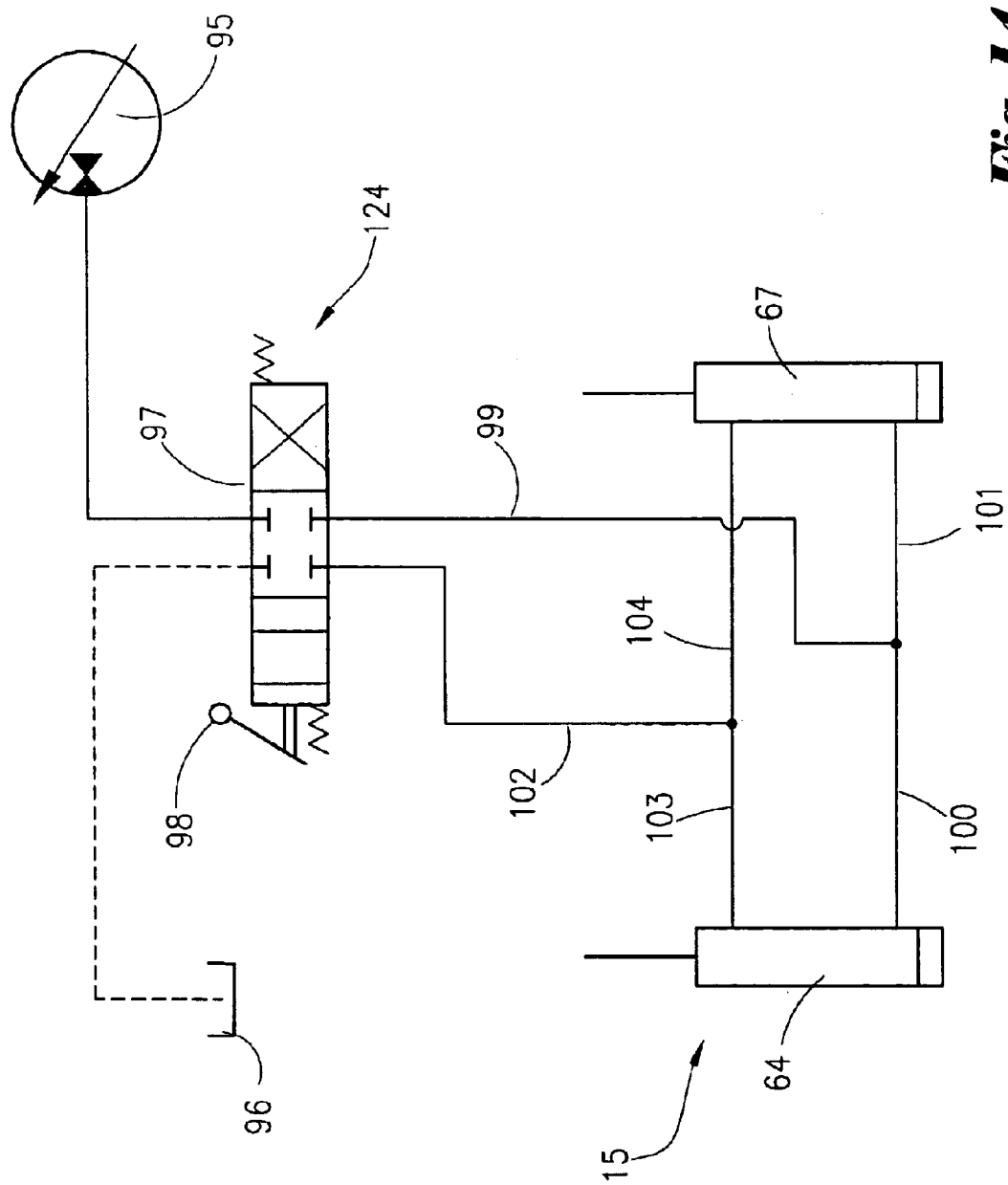
FIG. 14 is a schematic illustration of the hydraulic system of an embodiment of the multi-purpose tool of the present invention operationally connected to the hydraulic actuation unit of a front end loader.

FIGS. 2, 3, and 14 further reveal the assemblage of hydraulic system 15 of multi-purpose tool 10. Preferably, hydraulic system 15 includes at least one hydraulic cylinder 64 positioned on back side 17 of intermediate support frame 11. Hydraulic cylinder 64 is preferably operationally connected to pivoting sleeve 76. Pivoting sleeve 76 is preferably fixedly attached or welded to top side 22 of angled proximal section 24 of upper moveable jaw assembly 12.

Preferably, actuation of hydraulic cylinder 64 is capable of causing upper moveable jaw assembly 12 to pivot from an open to a closed position or from a closed to an open position relative to lower stationary jaw assembly 13. Preferably, upper moveable jaw assembly 12 pivots about an axis defined by top side edge portion 18 of intermediate support frame 11. In the closed position, angled distal section 26 of upper movable jaw assembly 12 is preferably positioned below lower stationary jaw assembly 13 as shown in FIGS. 6, 7, 12, and 13.

In the preferred embodiment of the present invention shown in FIGS. 2 and 3, hydraulic system 15 includes first hydraulic cylinder 64 and second hydraulic cylinder 67. First and second hydraulic cylinders 64, 67 are preferably each positioned on back side 17 of intermediate support frame 11.

First hydraulic cylinder 64 may have lower end 66 and upper moveable rod end 65. Lower end 66 may have affixed thereto lower coupling 71. Lower coupling 71 preferably has bore 75 extending there-through. Lower end 66 of first hydraulic cylinder 64 may be coupled to first connecting sleeve 84. Preferably, first connecting sleeve 84 is fixedly attached or welded to bottom side edge 19 of intermediate support frame 11 and/or to lower bracket support bar 50. First connecting sleeve 84 may have bore 86 extending there-through.

To secure lower end 66 of first hydraulic cylinder 64 to first connecting sleeve 84, lower coupling 71 is placed over first connecting sleeve 84 such that bore 75 in lower coupling 71 is aligned with bore 86 in first connecting sleeve 84. Coupling pin 87 is inserted through bores 75, 86 and held in position by a clasp (not shown) placed through recess 41 in coupling pin 87 or by other means such as a bolt or locking nut.

Upper moveable rod end 65 of first hydraulic cylinder 64 may have affixed thereto upper coupling 70. Upper coupling 70 preferably has bore 74 extending there-through. Upper moveable rod end 65 may be coupled to first pivoting sleeve 76 and more preferably to lever arm 78 of first pivoting sleeve 76. Lever arm 78 preferably has end 80 and end 80 of lever arm 78 preferably has bore 81 extending therethrough. Preferably, first pivoting sleeve 76 is fixedly attached or welded to top side 22 of angled proximal section 24 of upper moveable jaw assembly 12 and more preferably to top side 22 of proximal end 89 of one of fingers 21.

To secure upper moveable rod end 65 of first hydraulic cylinder 64 to first pivoting sleeve 76, upper coupling 70 of first hydraulic cylinder 64 is placed over end 80 of lever arm 78 of first pivoting sleeve 76 such that bore 74 in upper coupling 70 is aligned with bore 81 in end 80 of lever arm 78. Coupling pin 82 is inserted through bores 74, 81 and held in position by a clasp (not shown) placed through recess 125 in coupling pin 82 or by other means such as a bolt or locking nut.

Second hydraulic cylinder 67 may have lower end 69 and upper moveable rod end 68. Lower end 69 may have affixed thereto lower coupling 73. Lower coupling 73 preferably has bore 75 extending there-through. Lower end 69 of second hydraulic cylinder 67 may be coupled to second connecting sleeve 85. Preferably, second connecting sleeve 85 is fixedly attached or welded to bottom side edge 19 of intermediate support frame 11 and/or to lower bracket support bar 50. Second connecting sleeve 85 may have bore 86 extending there-through.

To secure lower end 69 of second hydraulic cylinder 67 to second connecting sleeve 85, lower coupling 73 is placed over second connecting sleeve 85 such that bore 75 in lower coupling 73 is aligned with bore 86 in second connecting sleeve 85. Coupling pin 87 is inserted through bores 75, 86 and held in position by a clasp (not shown) placed through a recess 41 in coupling pin 87 or by other means such as a bolt or locking nut. Upper moveable rod end 68 of second hydraulic cylinder 67 may have affixed thereto upper coupling 72. Upper coupling 72 preferably has bore 74 extending there-through. Upper moveable rod end 68 may be coupled to second pivoting sleeve 77 and more preferably to lever arm 79 of second pivoting sleeve 77. Lever arm 79 preferably has end 80 and end 80 of lever arm 79 preferably has bore 81 extending there-through. Preferably, second pivoting sleeve 77 is fixedly attached or welded to top side 22 of angled proximal section 24 of upper moveable jaw assembly 12 and more preferably to top side 22 of proximal end 89 of another one of fingers 21.

To secure upper moveable rod end 68 of second hydraulic cylinder 67 to second pivoting sleeve 77, upper coupling 72 of second hydraulic cylinder 67 is placed over end 80 of lever arm 79 of second pivoting sleeve 77 such that bore 74 in upper coupling 72 is aligned with bore 81 in end 80 of lever arm 79. Coupling pin 82 is inserted through bores 74, 81 and held in position by a clasp (not shown) placed through recess 125 in coupling pin 82 or by other means such as a bolt or locking nut.

Preferably, actuation of first and second hydraulic cylinders 64, 67 causes upper moveable jaw assembly 12 to pivot from an open to a closed position or from a closed to an open position relative to lower stationary jaw assembly 13. Again, it is preferred that upper moveable jaw assembly 12 pivot about an axis defined by top side edge portion 18 of intermediate support frame 11. In the closed position, angled distal section 26 of upper movable jaw assembly 12 is preferably positioned below lower stationary jaw assembly 13 as shown in FIGS. 6, 7, 12, and 13.

FIG. 14 shows a schematic representation of hydraulic system 15 of multi-purpose tool 10 operationally connected to hydraulic actuation unit 124 of front end loader 110. Hydraulic system 15 includes conduit 100 connected to lower (piston) end 66 of hydraulic cylinder 64 and conduit 101 connected to lower (piston) end 69 of hydraulic cylinder 67. Hydraulic system 15 also includes conduit 103 connected to upper moveable rod end 65 of hydraulic cylinder 64 and conduit 104 connected to upper moveable rod end 68 of hydraulic cylinder 67.

Hydraulic actuation unit 124 of front end loader 110 preferably includes pump 95 and hydraulic fluid tank 96 which are operationally connected to control valve 97. Control valve 97 directs or regulates the flow of hydraulic fluid in response to activation of lever 98, which is controlled by the operator of the front end loader 110. Conduit 99 is connected between control valve 97 and conduits 100, 101 and provides the flow of hydraulic fluid to and away from lower (piston) ends 66, 69 of hydraulic cylinders 64, 67 in response to control valve 97. Conduit 102 is connected between control valve 97 and conduits 103, 104 and provides the flow of hydraulic fluid to and away from upper moveable rod ends 65, 68 of hydraulic cylinders 64, 67 in response to control valve 97.

In the preferred embodiment of the present invention shown in FIGS. 2 and 3, multi-purpose tool 10 includes bracing beam 83 made of metal (e.g., steel) that is fixedly attached or welded to top side 22 of upper moveably jaw assembly 12. Preferably, bracing beam 83 is positioned perpendicular to fingers 21. It is also preferred that first and second pivoting sleeves 76, 77 be fixedly attached or welded to bracing beam 83. Bracing beam 83 is designed to brace and provide further structural support for first and second pivoting sleeves 76, 77 and to assist, via its linkage to pivoting sleeves 76, 77 and to upper moveable jaw assembly 12, the pivoting operation of upper moveable jaw assembly 12.

The specific construction of bracket assembly 14 and hydraulic system 15 as set forth herein describe a preferred embodiment of multi-purpose tool 10 for attachment to and use with front end loader 110 of tractors manufactured by John Deere. It is to be understood that bracket assembly 14 and hydraulic system 15 may need to be modified to make multi-purpose tool 10 adaptable for other makes and models of front end loaders, including those manufactured by Kubota, Ford, and any other model with a front end loader. Multi-purpose tool 10 may be adapted for attachment to any front end loader model by modifying bracket assembly 14 so that it is configured in such a way as to be secured to the attachment mechanism of the front end loader.

A novel method of operating multi-purpose tool 10 may include providing multi-purpose tool 10 having intermediate support frame 11 with front side 16, back side 17, top side edge portion 18, bottom side edge 19, and two side edges 20. Multi-purpose tool 10 also may include upper movable jaw assembly 12 having plurality of interconnected forwardly extending, spaced-apart parallel fingers 21 pivotally mounted to top side edge portion 18 of intermediate support frame 11. Upper movable jaw assembly 12 may have top side 22, bottom side 23, angled proximal section 24, straight central section 25, and angled distal section 26. Preferably, multi-purpose tool 10 includes lower stationary jaw assembly 13 having plurality of interconnected forwardly extending, spaced-apart parallel fingers 27 fixedly mounted to bottom side edge 19 of intermediate support frame 11. Lower stationary jaw assembly 13 may have top side 28, bottom side 29, angled proximal section 30, straight central section 31, and straight distal section 32.

Preferably, upper moveable jaw assembly 12 has a length that is greater than the length of lower stationary jaw assembly 13. It is also preferred that angled proximal section 24 of upper moveable jaw assembly 12 and angled distal section 26 of upper moveable jaw assembly 12 each be angled downward relative to straight central section 25 of upper moveable jaw assembly 12. Angled proximal section 30 of lower stationary jaw assembly 13 is preferably angled upward relative to straight central section 31 of lower stationary jaw assembly 13.

Multi-purpose tool 10 may also have bracket assembly 14 that is preferably fixedly attached to back side 17 of intermediate support frame 11. Bracket assembly 14 is preferably capable of mounting multi-purpose tool 10 to front end loader 110.

Hydraulic system 15 may also be part of multi-purpose tool 10. Hydraulic system 15 may include at least one hydraulic cylinder 64 positioned on back side 17 of intermediate support frame 11. Hydraulic cylinder 64 is preferably operationally connected to first pivoting 76 sleeve, which may be fixedly attached to top side 22 of angled proximal section 24 of upper moveable jaw assembly 12. Actuation of at least one hydraulic cylinder 64 is capable of causing upper moveable jaw assembly 12 to pivot from an open to a closed position or from a closed to an open position relative to lower stationary jaw assembly 13. In the closed position, angled distal section 26 of upper movable jaw assembly 12 is preferably positioned below lower stationary jaw assembly 13.

The method of the present invention also includes attaching multi-purpose tool 10 to front end loader 110 and connecting hydraulic system 15 to hydraulic actuation unit 124 of front end loader 110 in order to make hydraulic system 15 operational.

Once operational, hydraulic system 15 may be actuated to cause upper moveable jaw assembly 12 to pivot towards or away from lower stationary jaw assembly 13 as shown in FIG. 6. The extension of upper moveable rod ends 65, 68 of hydraulic cylinders 64, 67 causes upper moveable jaw assembly 12 to pivot downward towards lower stationary jaw assembly 13. When upper moveable rod ends 65, 68 are completely extended, upper moveable jaw assembly 12 is pivoted to its fully closed position causing angled distal section 26 of upper moveable jaw assembly 12 to contact lower stationary jaw assembly 13 at straight distal section 32 thereof. In this position, fingers 21 at angled distal section 26 of upper moveable jaw assembly 12 are situated between different adjacent fingers 27 at straight distal section 32 of lower stationary jaw assembly 13 and extend below lower stationary jaw assembly 13.

The contraction of upper moveable rod ends 65, 68 of hydraulic cylinders 64, 67 causes upper moveable jaw assembly 12 to pivot upwards and away from lower stationary jaw assembly 13. When upper moveable rod ends 65, 68 are completely contracted, upper moveable jaw assembly 12 is pivoted to its fully opened.

As shown in FIG. 7, the method of the present invention may also include tilting multi-purpose tool 10 in a clockwise or counter-clockwise direction by manipulation of tool connecting platform 117 of front end loader 110.

Figure 10:
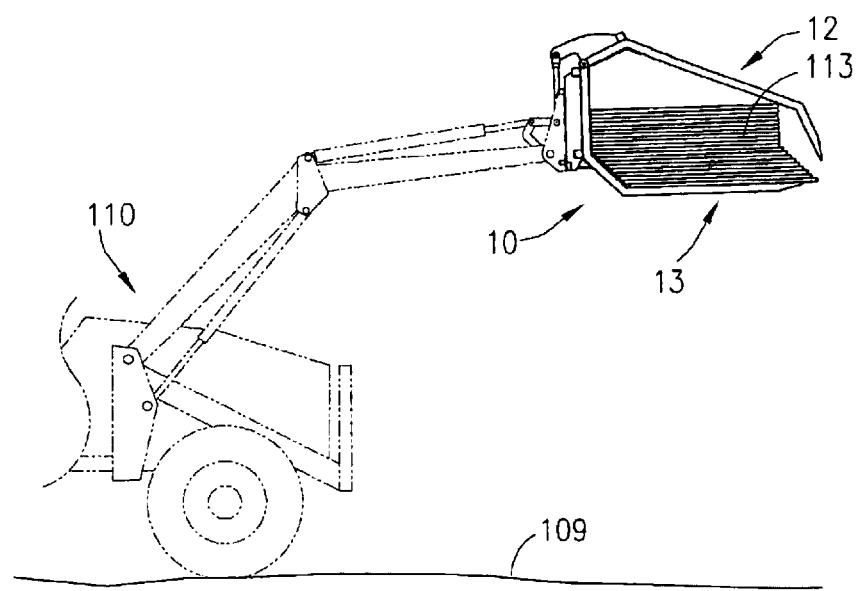
FIG. 10 is a side view of an embodiment of the multi-purpose tool of the present invention attached to the front end loader illustrating use of the multi-purpose tool to haul large, flat materials such as sheets of plywood.
Figure 11:
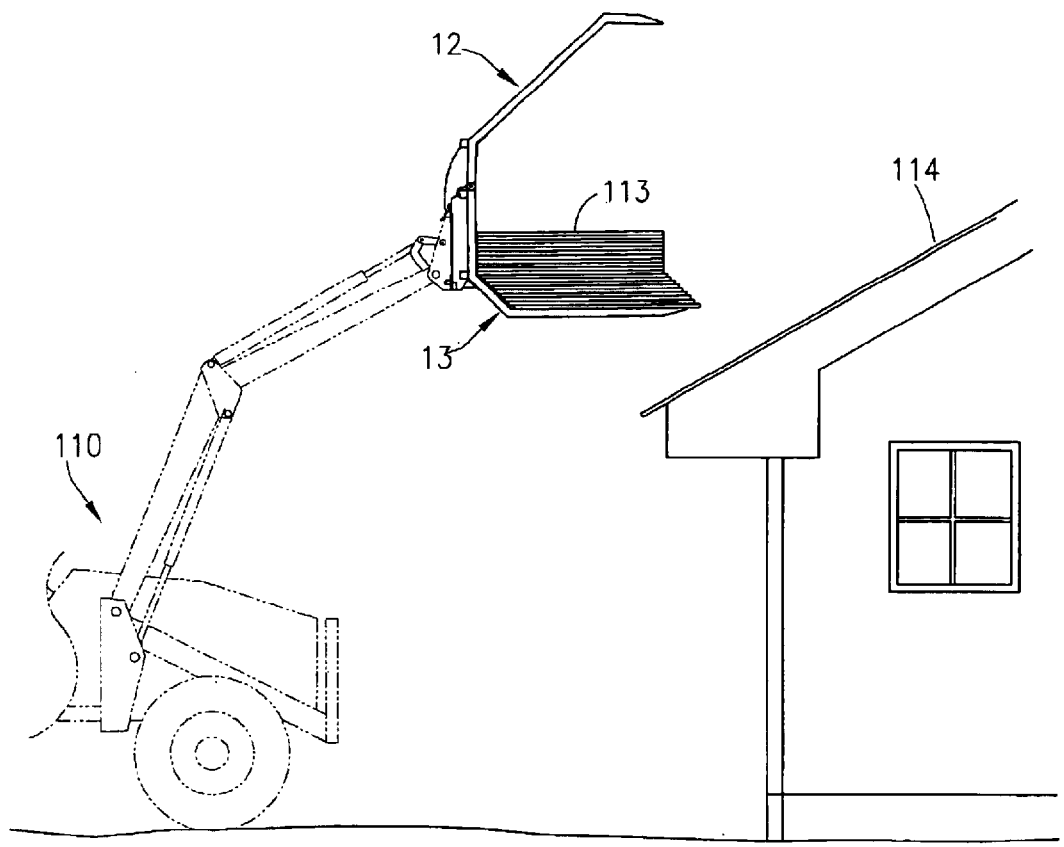
FIG. 11 is a side view of an embodiment of the multi-purpose tool of the present invention attached to a front end loader illustrating use of the tool as a platform for holding sheets of plywood at roof level to enable deployment of the plywood on the roof.

As illustrated in FIGS. 10 and 11, the method of the present invention may further include raising or lowering multi-purpose tool 10 relative to ground surface 109 by manipulation of arms 116 of front end loader 110.

The novel design of multi-purpose tool 10, including without limitation: (i) the forward projecting or extending shape of upper moveable jaw assembly 12 and lower stationary jaw assembly 13; (ii) the angular contour of upper moveable jaw assembly 12 and lower stationary jaw assembly 13; (iii) the pivoting mechanism which permits upper moveable jaw assembly 12 to pivot about the axis defined by top side edge portion 18 of intermediate support frame 11; (iv) the length of upper moveable jaw assembly 12 being greater than the length of lower stationary jaw assembly 13; and (v) the design and placement of fingers 21 of upper moveable jaw assembly 12 relative to fingers 27 of lower stationary jaw assembly 13 which allow fingers 21 to be positioned between adjacent fingers 27 and below lower stationary jaw assembly 13 when upper moveable jaw assembly 12 is in its fully closed position; achieves a multi-functional tool for a front end loader that is able to perform a variety of specialized tasks.

For example, FIG. 8 shows multi-purpose tool 10 being used to pickup a large quantity of refuse 111 from ground 109. FIG. 9 depicts multi-purpose tool 10 performing the delicate and precise operation of picking up pipe 112 from ground 109. FIG. 10 shows multi-purpose tool 10 hauling a large amount of stacked sheets of plywood 113. As seen in FIG. 11, multi-purpose tool 10 is positioned at roof level with upper moveable jaw assembly 12 in an open position providing access to sheets of plywood 113 for transfer to roof 114.

FIGS. 12 and 13 illustrate multi-purpose tool 10 being used to grade and dig trenches 115 in ground 109. This use of multi-purpose tool 10 can also function to dig up roots in ground 109. For this operation, upper moveable jaw assembly 12 is in its fully closed position.

These are but a few examples of the variety of tasks multi-purpose 10 is able to perform. It is to be understood that many other tasks can be accomplished by operation of multi-purpose tool 10.

While preferred embodiments of the present invention have been described, it is to be understood that the embodiment described are illustrative only and that the scope of the invention is to be defined solely by the appended claims when accorded a full range of equivalents, many variations and modifications naturally occurring to those skilled in the art from a perusal hereof.

What is claimed is:

1. A multi-purpose tool for a front end loader of a tractor, comprising:

an intermediate support frame having a front side, a back side, a top side edge portion, a bottom side edge, and two side edges;

an upper movable jaw assembly including a plurality of interconnected forwardly extending, spaced-apart parallel fingers pivotally mounted to the top side edge portion of the intermediate support frame, said upper movable jaw assembly having a top side, a bottom side, an angled proximal section, a straight central section, and an angled distal section;

a lower stationary jaw assembly including a plurality of interconnected forwardly extending, spaced-apart parallel fingers fixedly mounted to the bottom side edge of the intermediate support frame, said lower stationary jaw assembly having a top side, a bottom side, an angled proximal section, a straight central section, and a straight distal section;

said upper moveable jaw assembly having a length that is greater than a length of the lower stationary jaw assembly;

said angled proximal section of the upper moveable jaw assembly and said angled distal section of the upper moveable jaw assembly each being angled downward relative to said straight central section of said upper moveable jaw assembly;

said angled proximal section of the lower stationary jaw assembly being angled upward relative to said straight central section of said lower stationary jaw assembly;

a bracket assembly fixedly attached to the back side of the intermediate support frame, said bracket assembly capable of mounting the multi-purpose tool to a front end loader;

a hydraulic system including at least one hydraulic cylinder positioned on the back side of the intermediate support frame, said hydraulic cylinder being operationally connected to a pivoting sleeve fixedly attached to the top side of the angled proximal section of the upper moveable jaw assembly, wherein actuation of the at least one hydraulic cylinder is capable of causing the upper moveable jaw assembly to pivot from an open to a closed position or from a closed to an open position relative to the lower stationary jaw assembly and wherein in the closed position the angled distal section of the upper movable jaw assembly is positioned below the lower stationary jaw assembly.

2. The multi-purpose tool for a front end loader of a tractor according to claim 1, wherein the intermediate support frame comprises:

a bottom support beam;

a plurality of support posts extending upward and perpendicular to said bottom support beam, each of said plurality of support posts having an upper end and a lower end, said lower end of each of said plurality of support posts being fixedly attached to the bottom support beam.

3. The multi-purpose tool for a front end loader of a tractor according to claim 1, wherein the plurality of interconnected forwardly extending, spaced-apart parallel fingers of the upper moveable jaw assembly are interconnected by at least two cross-bars.

4. The multi-purpose tool for a front end loader of a tractor according to claim 3, wherein one of said at least two cross-bars is positioned at a first end of the straight central section of the upper moveable jaw assembly and another one of said at least two cross-bars is positioned at a second end of the straight central section of the upper moveable jaw assembly.

5. The multi-purpose tool for a front end loader of a tractor according to claim 1, wherein the plurality of interconnected forwardly extending, spaced-apart parallel fingers of the upper moveable jaw assembly are pivotally mounted to the top side edge portion of the intermediate support frame by a hinge means.

6. The multi-purpose tool for a front end loader of a tractor according to claim 5, wherein the hinge means comprises:

a first plurality of spaced-apart hinge tubes, each hinge tube being fixedly attached to a proximal end of a different one of said plurality of forwardly extending, spaced-apart parallel fingers of the upper moveable jaw assembly;

a second plurality of spaced-apart hinge tubes, each hinge tube being fixedly attached to the top side edge portion of the intermediate support frame;

said first and second plurality of spaced-apart hinge tubes being aligned together in a single-row to form an elongated continuous tube having opposite open ends;

a hinge rod positioned within the elongated continuous tube;

a closure means secured to each opposite end of the elongated continuous tube to maintain the hinge rod therein.

7. The multi-purpose tool for a front end loader of a tractor according to claim 6, wherein each hinge tube of the first and second plurality of spaced-apart hinge tubes includes a lubricant access port capable of permitting introduction of a lubricant into an internal cavity in the hinge tube around an outer surface of a portion of the hinge rod.

8. The multi-purpose tool for a front end loader of a tractor according to claim 1, wherein the angle of the angled proximal section of the upper moveable jaw assembly and the angle of the distal section of the upper moveable jaw assembly are each between 30 and 40 degrees relative to the straight central section of the upper moveable jaw assembly.

9. The multi-purpose tool for a front end loader of a tractor according to claim 1, wherein the plurality of interconnected forwardly extending, spaced-apart parallel fingers of the lower stationary jaw assembly are interconnected by at least two cross-bars.

10. The multi-purpose tool for a front end loader of a tractor according to claim 9, wherein one of said at least two cross-bars is positioned at a first end of the straight central section of the lower stationary jaw assembly and another one of said at least two cross-bars is positioned at a second end of the straight central section of the lower stationary jaw assembly.

11. The multi-purpose tool for a front end loader of a tractor according to claim 1, wherein the angle of the angled proximal section of the lower stationary jaw assembly is between 30 and 40 degrees relative to the straight central section of the lower stationary jaw assembly.

12. The multi-purpose tool for a front end loader of a tractor according to claim 1, wherein a cover plate is fixedly attached to the front side of the intermediate support frame.

13. The multi-purpose tool for a front end loader of a tractor according to claim 2, wherein the plurality of interconnected forwardly extending, spaced-apart fingers of the upper moveable jaw assembly are pivotally mounted to the top side edge portion of the intermediate support frame by a hinge means, said hinge means comprising:

a first plurality of spaced-apart hinge tubes, each hinge tube being fixedly attached to a proximal end of a different one of said plurality of forwardly extending, spaced-apart parallel fingers of the upper moveable jaw assembly;

a second plurality of spaced-apart hinge tubes, each hinge tube being fixedly attached to the upper end of a different one of said plurality of support posts of said intermediate support frame;

said first and second plurality of spaced-apart hinge tubes being aligned together in a single-row to form an elongated continuous tube having opposite open ends;

a hinge rod positioned within the elongated continuous tube;

a closure means secured to each opposite end of the elongated continuous tube to maintain the hinge rod therein.

14. A multi-purpose tool for a front end loader of a tractor, comprising:

an intermediate support frame having a front side, a back side, a top side edge portion, a bottom side edge, and two side edges;

an upper movable jaw assembly including a plurality of interconnected forwardly extending, spaced-apart parallel fingers pivotally mounted to the top side edge portion of the intermediate support frame, said upper movable jaw assembly having a top side, a bottom side, an angled proximal section, a straight central section, and an angled distal section;

a means for pivotally mounting the plurality of interconnected forwardly extending, spaced-apart parallel fingers of the upper moveable jaw assembly to the top side edge portion of the intermediate support frame;

a lower stationary jaw assembly including a plurality of interconnected forwardly extending spaced-apart parallel fingers fixedly mounted to the bottom side edge of the intermediate support frame, said lower stationary jaw assembly having a top side, a bottom side, an angled proximal section, a straight central section, and a straight distal section;

said upper moveable jaw assembly having a length that is greater than a length of the lower stationary jaw assembly;

said angled proximal section of the upper moveable jaw assembly and said angled distal section of the upper moveable jaw assembly each being angled downward relative to said straight central section of said upper moveable jaw assembly;

said angled proximal section of the lower stationary jaw assembly being angled upward relative to said straight central section of said lower stationary jaw assembly;

a means for mounting the multi-purpose tool to a front end loader, said means for mounting being fixedly attached to the back side of the intermediate support frame;

a hydraulic system including a first hydraulic cylinder and a second hydraulic cylinder each positioned on the back side of the intermediate support frame;

said first hydraulic cylinder having a lower end and an upper moveable rod end, said lower end of the first hydraulic cylinder being coupled to a connecting sleeve fixedly attached to the bottom side of the intermediate support frame, said upper moveable rod end of the first hydraulic cylinder being coupled to a lever arm of a first pivoting sleeve fixedly attached to a proximal end of one of said plurality of forwardly extending, spaced-apart parallel fingers of the upper moveable jaw assembly;

said second hydraulic cylinder having a lower end and an upper moveable rod end, said lower end of the second hydraulic cylinder being coupled to a connecting sleeve fixedly attached to the bottom side of the intermediate support frame, said upper moveable rod end of the second hydraulic cylinder being coupled to a lever arm of a second pivoting sleeve fixedly attached to a proximal end of another one of said plurality of forwardly extending, spaced-apart parallel fingers of the upper moveable jaw assembly;

wherein actuation of the first and second hydraulic cylinders causes the upper moveable jaw assembly to pivot from an open to a closed position or from a closed to an open position relative to the lower stationary jaw assembly and wherein in the closed position the angled distal section of the upper moveable jaw assembly is positioned below the lower stationary jaw assembly.

15. The multi-purpose tool for a front end loader of a tractor according to claim 14, wherein the means for mounting the multi-purpose tool to a front end loader comprises:

an upper bracket support bar fixedly attached to the back side of the intermediate support frame;

a lower bracket support bar fixedly attached to the back side of the intermediate support frame;

a first bracket beam interconnecting the upper and lower bracket support bars;

a second bracket beam interconnecting the upper and lower bracket support bars;

said first and second bracket beams each having a back surface with an upper and lower end;

a first U-shaped bracket fixedly attached to the upper end of the back surface of the first bracket beam, said first U-shaped bracket capable of accommodating an upper portion of a tool connecting platform of a first front end loader arm;

a first retaining plate fixedly attached to the lower end of the back surface of the first bracket beam, said first retaining plate capable of detachably securing to a lower portion of the tool connecting platform of the first front end loader arm;

a second U-shaped bracket fixedly attached to the upper end of the back surface of the second bracket beam, said second U-shaped bracket capable of accommodating an upper portion of a tool connecting platform of a second front end loader arm;

a second retaining plate fixedly attached to the lower end of the back surface of the second bracket beam, said second retaining plate capable of detachably securing to a lower portion of the tool connecting platform of the second front end loader arm.

16. The multi-purpose tool for a front end loader according to claim 15, wherein the first retaining plate has a retaining pin protruding therefrom which is capable of being detachably received within a bore located in the lower portion of the tool connecting platform of the first front end loader arm and wherein the second retaining plate has a retaining pin protruding therefrom which is capable of being detachably received within a bore located in the lower portion of the tool connecting platform of the second front end loader arm.

17. The multi-purpose tool for a front end loader according to claim 14, further comprising a bracing beam fixedly attached to the top side of the upper moveable jaw assembly, said bracing beam bracing the first and second pivoting sleeves which are fixedly attached thereto.

18. A method of operating a multi-purpose tool for a front end loader of a tractor, comprising the steps of:

providing a multi-purpose tool for a front end loader comprising:

an intermediate support frame having a front side, a back side, a top side edge portion, a bottom side edge, and two side edges;

an upper movable jaw assembly including a plurality of interconnected forwardly extending, spaced-apart parallel fingers pivotally mounted to the top side edge portion of the intermediate support frame, said upper movable jaw assembly having a top side, a bottom side, an angled proximal section, a straight central section, and an angled distal section;

a lower stationary jaw assembly including a plurality of interconnected forwardly extending, spaced-apart parallel fingers fixedly mounted to the bottom side edge of the intermediate support frame, said lower stationary jaw assembly having a top side, a bottom side, an angled proximal section, a straight central section, and a straight distal section;

said upper moveable jaw assembly having a length that is greater than a length of the lower stationary jaw assembly;

said angled proximal section of the upper moveable jaw assembly and said angled distal section of the upper moveable jaw assembly each being angled downward relative to said straight central section of said upper moveable jaw assembly;

said angled proximal section of the lower stationary jaw assembly being angled upward relative to said straight central section of said lower stationary jaw assembly;

a bracket assembly fixedly attached to the back side of the intermediate support frame, said bracket assembly capable of mounting the multi-purpose tool to the front end loader;

a hydraulic system including at least one hydraulic cylinder positioned on the back side of the intermediate support frame, said hydraulic cylinder being operationally connected to a pivoting sleeve fixedly attached to the top side of the angled proximal section of the upper moveable jaw assembly, wherein actuation of the at least one hydraulic cylinders is capable of causing the upper moveable jaw assembly to pivot from an open to a closed position or from a closed to an open position relative to the lower stationary jaw assembly and wherein in the closed position the angled distal section of the upper movable jaw assembly is positioned below the lower stationary jaw assembly;

attaching the multi-purpose tool to the front end loader;

connecting the hydraulic system of the multi-purpose tool to a hydraulic actuation unit of the front end loader in order to make the hydraulic system operational;

actuating the hydraulic system to cause the upper moveable jaw assembly to pivot towards or away from the lower stationary jaw assembly.

19. The method according to claim 18, further comprising the step of:

tilting the multi-purpose tool for a front end loader in a clockwise or counter-clockwise direction.

20. The method according to claim 18, further comprising the step of:

raising or lowering the multi-purpose tool for a front end loader relative to a ground surface.

* * * * *